United States Patent
Miyatani et al.

(10) Patent No.: US 9,407,842 B2
(45) Date of Patent: Aug. 2, 2016

(54) IMAGE PICKUP APPARATUS AND IMAGE PICKUP METHOD FOR PREVENTING DEGRADATION OF IMAGE QUALITY

(71) Applicant: SONY CORPORATION, Minato-ku (JP)

(72) Inventors: Yoshitaka Miyatani, Tokyo (JP); Kazuki Akaho, Tokyo (JP)

(73) Assignee: SONY CORPORATION, Tokyo (JP)

( * ) Notice: Subject to any disclaimer, the term of this patent is extended or adjusted under 35 U.S.C. 154(b) by 95 days.

(21) Appl. No.: 13/908,183

(22) Filed: Jun. 3, 2013

(65) Prior Publication Data
US 2014/0028881 A1    Jan. 30, 2014

(30) Foreign Application Priority Data

Jul. 26, 2012  (JP) .................................. 2012-165341

(51) Int. Cl.
- *H04N 5/357* (2011.01)
- *H04N 5/369* (2011.01)
- *H04N 9/04* (2006.01)
- *H04N 5/345* (2011.01)
- *H04N 5/378* (2011.01)

(52) U.S. Cl.
CPC ............ *H04N 5/3572* (2013.01); *H04N 5/345* (2013.01); *H04N 5/357* (2013.01); *H04N 5/3696* (2013.01); *H04N 5/378* (2013.01); *H04N 9/04* (2013.01)

(58) Field of Classification Search
None
See application file for complete search history.

(56) References Cited

U.S. PATENT DOCUMENTS

| | | | |
|---|---|---|---|
| 2009/0219423 A1* | 9/2009 | Suzuki ........................... | 348/302 |
| 2010/0194967 A1* | 8/2010 | Amano ..................... | G02B 7/34 348/345 |
| 2010/0214452 A1* | 8/2010 | Kawarada .............. | G02B 7/346 348/255 |
| 2010/0238343 A1* | 9/2010 | Kawarada ..................... | 348/345 |
| 2011/0019028 A1* | 1/2011 | Kimijima et al. .......... | 348/222.1 |
| 2011/0085785 A1* | 4/2011 | Ishii ....................... | G03B 13/00 396/104 |
| 2011/0109775 A1* | 5/2011 | Amano ......................... | 348/241 |
| 2012/0236185 A1* | 9/2012 | Ishii ........................ | G02B 7/34 348/246 |
| 2013/0002911 A1* | 1/2013 | Miyashita et al. ............ | 348/247 |

FOREIGN PATENT DOCUMENTS

WO    WO 2011155297 A1 * 12/2011

OTHER PUBLICATIONS

U.S. Appl. No. 13/911,186, filed Jun. 6, 2013, Miyatani, et al.

* cited by examiner

*Primary Examiner* — Dennis Hogue
(74) *Attorney, Agent, or Firm* — Chip Law Group

(57) ABSTRACT

There is provided an image pickup apparatus including an image sensor including a plurality of phase difference detection pixels that each perform pupil division of a photographing lens, a gain acquisition unit for acquiring a gain used to correct an output of the phase difference detection pixels, and a correction processing unit for correcting the output of the phase difference detection pixels using the gain acquired by the gain acquisition unit.

8 Claims, 8 Drawing Sheets

FIG. 2

| R | G | R | G | R | G | R | G | R | G | R | G | R |
|---|---|---|---|---|---|---|---|---|---|---|---|---|
| G | B | G | B | G | B | G | B | G | B | G | B | G |
| R | P1(G) | R | P2(G) | R | P1(G) | R | P2(G) | R | P1(G) | R | P2(G) | R |
| G | B | G | B | G | B | G | B | G | B | G | B | G |
| R | G | R | G | R | G | R | G | R | G | R | G | R |
| G | B | G | B | G | B | G | B | G | B | G | B | G |
| R | P1(G) | R | P2(G) | R | P1(G) | R | P2(G) | R | P1(G) | R | P2(G) | R |
| G | B | G | B | G | B | G | B | G | B | G | B | G |
| R | G | R | G | R | G | R | G | R | G | R | G | R |
| G | B | G | B | G | B | G | B | G | B | G | B | G |
| R | P1(G) | R | P2(G) | R | P1(G) | R | P2(G) | R | P1(G) | R | P2(G) | R |
| G | B | G | B | G | B | G | B | G | B | G | B | G |

IMAGE PICKUP APPARATUS AND IMAGE PICKUP METHOD FOR PREVENTING DEGRADATION OF IMAGE QUALITY

BACKGROUND

The present technology relates to an image pickup apparatus and an image pickup method.

Recently, a method of implementing a fast auto focus (AF) by embedding pixels used for detecting the phase difference into an image sensor has been widely used in an image pickup apparatus. However, there is a problem that a portion in which a phase difference detection pixel is embedded in image sensors is treated as a defective pixel, which leads to degradation of image quality. Therefore, there has been proposed a technique for calculating an output of a phase difference detection pixel using information from neighboring pixels of the phase difference detection pixel, thereby preventing degradation of image quality (see Japanese Unexamined Patent Application Publication No. 2009-44637).

SUMMARY

However, when information from neighboring pixels of the phase difference detection pixel is used, there is a problem that it is difficult to prevent degradation of image quality in high frequency components of a subject.

An embodiment of the present technology has been made in view of the above problem, and thus there is provided an image pickup apparatus and image pickup method capable of preventing degradation of image quality of the image to be acquired by an image sensor including a phase difference detection pixel.

According to a first embodiment of the present technology, there is provided an image pickup apparatus including an image sensor including a plurality of phase difference detection pixels that each perform pupil division of a photographing lens, a gain acquisition unit for acquiring a gain used to correct an output of the phase difference detection pixels, and a correction processing unit for correcting the output of the phase difference detection pixels using the gain acquired by the gain acquisition unit.

Further, according to a second embodiment of the present technology, there is provided an image pickup method implemented by an image pickup apparatus including an image sensor including a plurality of phase difference detection pixels that each perform pupil division of a photographing lens, the method including acquiring a gain used to correct an output of the phase difference detection pixels, and correcting the output of the phase difference detection pixels using the gain.

According to the embodiments of the present technology, it is possible to prevent degradation of image quality of the image to be acquired by an image sensor including a phase difference detection pixel.

BRIEF DESCRIPTION OF THE DRAWINGS

FIG. 2 is a diagram illustrating a configuration of an image sensor;

DETAILED DESCRIPTION OF THE EMBODIMENT(S)

Figure 1:
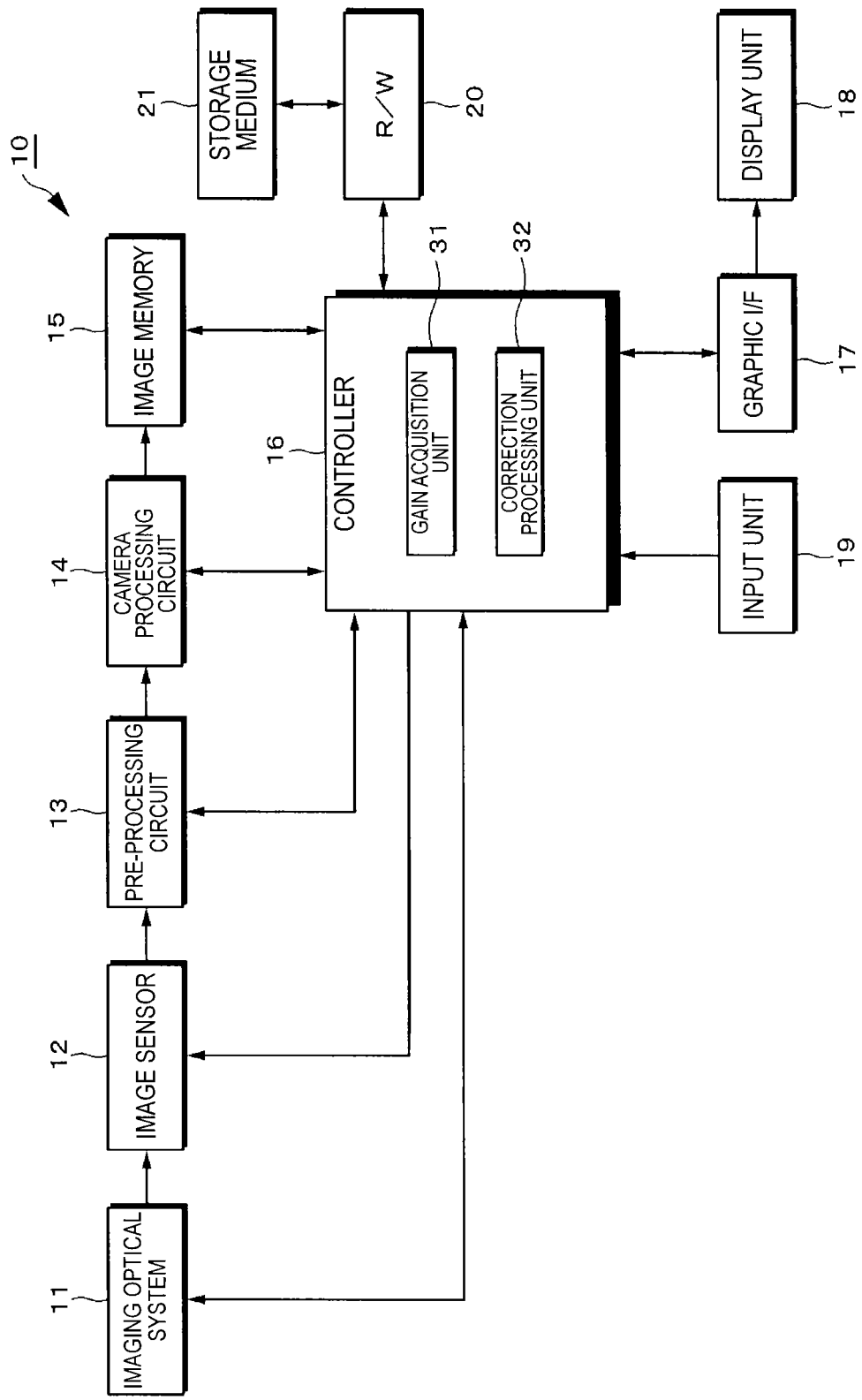
FIG. 1 is a block diagram illustrating a configuration of an image pickup apparatus according to an embodiment of the present technology.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
<1. Embodiment>
[1-1. Configuration of Image Pickup Apparatus]
[1-2. Correction Process]
<2. Modified Example>

1. Embodiment

1-1. Configuration of Image Pickup Apparatus

A configuration of an image pickup apparatus 10 according to an embodiment of the present technology will be described. FIG. 1 is a block diagram illustrating an overall configuration of the image pickup apparatus 10.

The image pickup apparatus 10 is configured to include an imaging optical system 11, an image sensor 12, a pre-processing circuit 13, a camera processing circuit 14, an image memory 15, a controller 16, a graphic interface (I/F) 17, a display unit 18, an input unit 19, a reader/writer (R/W) 20, and a storage medium 21. Among them, the imaging optical system 11, the pre-processing circuit 13, the camera processing circuit 14, the image memory 15, the graphic I/F 17, the input unit 19, and the R/W 20 are connected to the controller 16. In addition, the controller 16 functions as a gain acquisition unit 31 and a correction processing unit 32.

The imaging optical system 11 is configured to include a photographing lens, a drive mechanism, a shutter mechanism, an iris mechanism, and so on. The photographing lens is used to concentrate light from a subject on the image sensor 12. The drive mechanism is used to perform focusing or zooming by moving the photographing lens. These components in the imaging optical system 11 are driven based on a control signal from the controller 16. An optical image of a subject obtained through the imaging optical system 11 is imaged on the image sensor 12 which serves as an image pickup device.

The image sensor includes red (R), green (G) and blue (B) pixels which are normal imaging pixels, and a phase difference detection pixel which is used to detect a phase difference. Each pixel that constitutes the image sensor 12 photoelectrically converts an incident light from a subject into electrical charges, thereby outputting a pixel signal. The image sensor 12 finally outputs an imaging signal which is composed of pixel signals to the pre-processing circuit 13. The image sensor 12 may be a charge coupled device (CCD), a complementary metal oxide semiconductor (CMOS), or the like. In addition, a more detailed description of the image sensor will be described later.

The pre-processing circuit 13 performs a sample-and-hold process or the like on the imaging signal outputted from the image sensor 12 so as to maintain a good signal-to-noise (S/N) ratio using a correlated double sampling (CDS) process. Furthermore, the pre-processing circuit 13 controls a gain using an auto gain control (AGC) process and performs an analog-to-digital (A/D) conversion to output digital image signals.

The camera processing circuit 14 performs a signal process, such as a white balance adjustment process or color correction process, a gamma correction process, Y/C conversion process, and an auto exposure (AE) process, on the image signal provided from the pre-processing circuit 13.

The image memory 15 is a buffer memory which is composed of a volatile memory, for example, a dynamic random access memory (DRAM), and temporarily stores image data obtained by performing the predetermined process in the pre-processing circuit 13 and the camera processing circuit 14.

The controller 16 is configured to include, for example, a CPU, a RAM, and a ROM. The ROM stores a program or the like to be read and executed by the CPU. The RAM is used as a work memory of the CPU. The CPU executes various processes according to the program stored in the ROM and issues commands to control the entire image pickup apparatus 10. In addition, the controller 16 functions as the gain acquisition unit 31 and the correction processing unit 32 by executing a predetermined program.

The gain acquisition unit 31 acquires a gain to be multiplied to a pixel signal so as to correct the pixel signal outputted from phase difference detection pixels constituting an image sensor. A detailed description of a method of acquiring the gain will be described later.

The correction processing unit 32 corrects the pixel signal which is an output of each pixel by multiplying the pixel signal outputted from each pixel constituting an image sensor by the gain obtained by the gain acquisition unit 31.

In this regard, the gain acquisition unit 31 and the correction processing unit 32 may be implemented by program instructions. Alternatively, each of the gain acquisition unit 31 and the correction processing unit 32 may be implemented as a dedicated device configured by hardware having their respective functions.

The graphic I/F 17 generates an image signal to be displayed on the display unit 18 from the image signal supplied from the controller 16, supplies the image signal to the display unit 18, and then allows the display unit 18 to display an image. The display unit 18 is a display means which includes, for example, a liquid crystal display (LCD), a plasma display panel (PDP), and an organic electro luminescence (EL) panel. The display unit 18 may display a through image which is currently being captured, an image recorded in the storage medium 21, or the like.

The input unit 19 is configured to include, for example, a power button for power on/off switching, a release button for instructing the start of recording a captured image, an operator for adjusting zoom, a touch screen formed integrally with the display unit 18, or the like. If an operation is inputted through the input unit 19, then a control signal corresponding to the inputted operation is generated and the generated control signal is outputted to the controller 16. The controller 16 then performs an operation processing or controlling in response to the control signal.

The R/W 20 is an interface which is connected with the storage medium 21 for storing image data or the like generated by capturing an image. The R/W 20 writes data which is supplied from the controller 16 to the storage medium 21 and outputs data which is read from the storage medium 21 to the controller 16. The storage medium 21 may be a mass storage medium such as a hard disk, a memory stick (registered trademark of Sony Corporation), and a SD memory card. Image may be stored in a compressed state based on standards such as JPEG. Exchangeable image file format (EXIF) data including additional information such as information about the stored image and the captured date and time of the image is also stored in the storage medium 21 in association with the image.

A basic operation to be performed in the image pickup apparatus 10 described above will now be described. Before capturing an image, incident light is photoelectrically converted in the image sensor 12, and then the converted signals are sequentially supplied to the pre-processing circuit 13. The pre-processing circuit 13 performs a CDS process, an AGC process, or the like on the signal supplied from the image sensor 12 and converts the signal into an image signal.

The camera processing circuit 14 performs an image quality correction process on the image signal supplied from the pre-processing circuit 13 and supplies the processed signal as a camera through image to the graphic I/F 17 via the controller 16. In this way, the camera through image is displayed on the display unit 18. A user can adjust the angle of view while viewing the through image displayed on the display unit 18.

In this state, when the release button on the input unit 19 is pressed, the controller 16 outputs a control signal to the imaging optical system 11 so as to cause a shutter constituting the imaging optical system 11 to be activated. This allows image signals for one frame to be outputted from the image sensor 12.

The camera processing circuit 14 performs the image quality correction process on the image signals for one frame supplied from the image sensor 12 via the pre-processing circuit 13, and supplies the processed image signal to the controller 16. The controller 16 compresses and encodes the image signal inputted from the camera processing circuit 14, and supplies the generated encoded data to the R/W 20. As a result, a data file of the captured still image is stored in the storage medium 21.

On the other hand, when the image file stored in the storage medium 21 is played back, the controller 16 reads the selected still image file from the storage medium 21 via the R/W 20 according to an operation input from the input unit 19. The decompression and decoding process is performed on the read image file. The decoded image signal is supplied to the graphic I/F 17 via the controller 16. As a result, the still images stored in the storage medium 21 are displayed on the display unit 18.

Next, a configuration of the image sensor 12 will now be described. FIG. 2 is a diagram illustrating an array of normal pixels and phase difference detection pixels in the image sensor 12. In FIG. 2, R indicates red (R) pixels, G indicates green (G) pixels, and B indicates blue (B) pixels, which are normal imaging pixels.

In FIG. 2, P1 indicates a first phase difference detection pixel, and P2 indicates a second phase difference detection pixel. The phase difference detection pixel is configured as a pair of P1 and P2. The phase difference detection pixels P1 and P2 have optical characteristics different from normal imaging pixels. In addition, in FIG. 2, G pixel is set as a phase difference detection pixel. This is because there are two times as many G pixels as there are R and B pixels. However, the phase difference detection pixel is not limited to G pixel.

The image sensor 12 includes phase difference detection pixels in addition to normal pixels. Thus, the image pickup apparatus 10 can perform so-called image plane phase difference AF (auto focus) by an output from the phase difference detection pixel.

Figure 3:
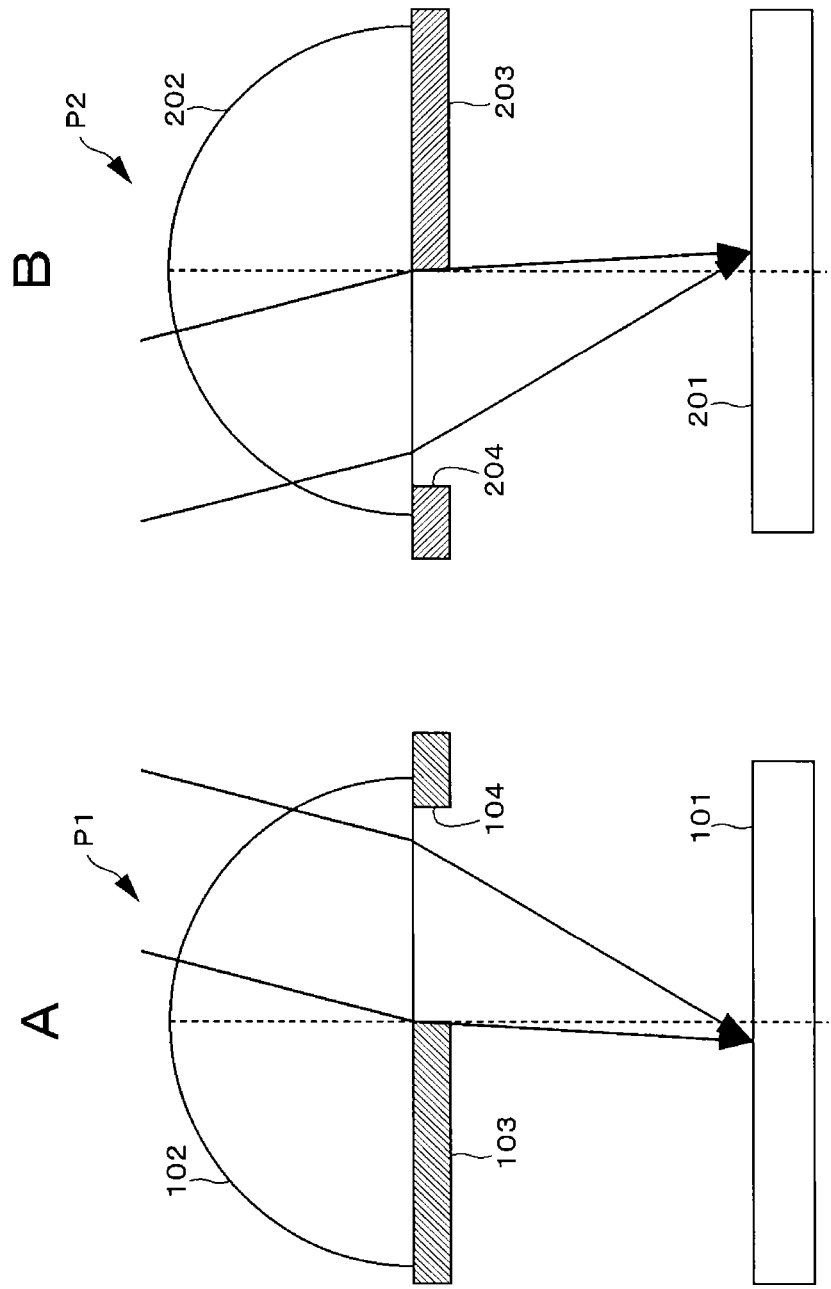
FIG. 3A is a diagram illustrating a configuration of a first phase difference detection pixel.
FIG. 3B is a diagram illustrating a configuration of a second phase difference detection pixel.

FIGS. 3A and 3B are diagrams illustrating a configuration of the phase difference detection pixel. FIG. 3A illustrates the first phase difference detection pixel P1, and FIG. 3B illustrates the second phase difference detection pixel P2.

The first phase difference detection pixel P1 includes a photodetector 101. The first phase difference detection pixel P1 is provided with a microlens 102 at the light incident side. Further, the first phase difference detection pixel P1 is provided with a light shielding layer 103 for shielding incident light so as to perform pupil division. The light shielding layer 103 is disposed between the photodetector 101 and the microlens 102. The light shielding layer 103 is configured to include an opening 104 which is eccentric to one side direction with respect to the center of the photodetector 101.

With such a configuration of the first phase difference detection pixel P1, only a portion of the incident light reaches the photodetector 101 as illustrated in FIG. 2A.

The second phase difference detection pixel includes a photodetector 201. The second phase difference detection pixel is provided with a microlens 202 at a light incident side. Further, the second phase difference detection pixel is provided with a light shielding layer 203 for shielding incident light so as to perform pupil division. The light shielding layer 203 is disposed between the photodetector 201 and the microlens 202. The light shielding layer 203 is configured to include an opening 204 which is eccentric to one side direction with respect to the center of the photodetector.

The light shielding layer 203 is configured to shield the side opposite to the direction which is shielded by the light shielding layer 103 in the first phase difference detection pixel P1. Thus, the first phase difference detection pixel P1 and the second phase difference detection pixel P2 are configured to shield the incident light at opposite sides to each other with respect to the distance measuring direction.

With such a configuration of the second phase difference detection pixel P2, only a portion of the incident light reaches the photodetector 201 as illustrated in FIG. 2B.

Figure 4:
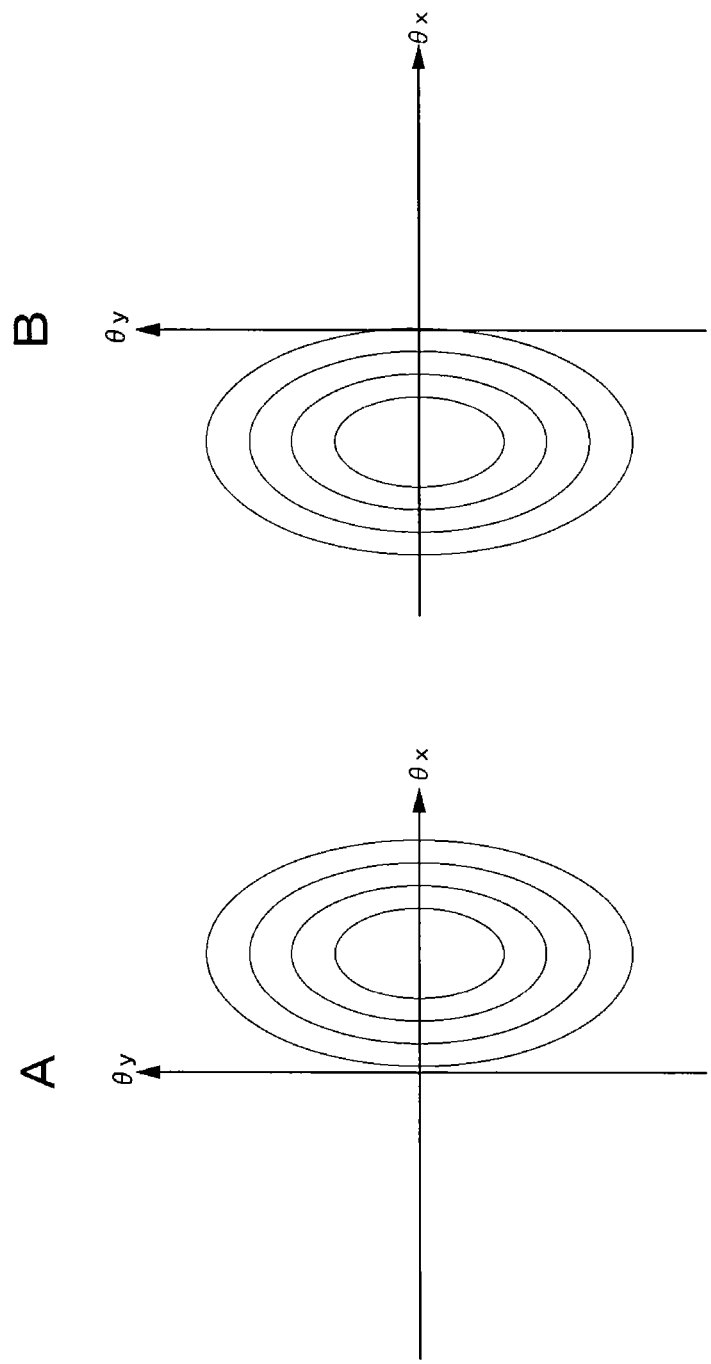
FIG. 4A is a diagram for explaining a light receiving distribution of the first phase difference detection pixel.
FIG. 4B is a diagram for explaining a light receiving distribution of the second phase difference detection pixel.

FIGS. 4A and 4B are diagrams illustrating a light receiving distribution of the phase difference detection pixel with respect to the angle of incident light. FIG. 4A is a diagram illustrating the light receiving distribution of the first phase difference detection pixel P1 shown in FIG. 3A, and FIG. 4B is a diagram illustrating the light receiving distribution of the second phase difference detection pixel P2 shown in FIG. 3B.

Since the first phase difference detection pixel P1 and the second phase difference detection pixel P2 are configured to shield the incident light at opposite sides to each other with respect to the distance measuring direction, light receiving distributions of the P1 and P2 are different from each other. In the first phase difference detection pixel P1 shown in FIG. 4A, the light receiving distribution is spread only in a direction from which the incident light is not shielded. On the other hand, in the second phase difference detection pixel P2 shown in FIG. 4B, the light receiving distribution is spread only in a direction from which the incident light is not shielded, and this direction is opposite to the direction from which the incident light is not shielded in the first phase difference detection pixel P1. In this way, the first phase difference detection pixel P1 and the second phase difference detection pixel P2 are different in sensitivity.

Therefore, the incident light is shielded for the phase difference detection pixels, but an output from normal pixels where the incident light is not shielded will be reduced. Accordingly, it is difficult to use imaging pixels without being subjected to any process.

In this regard, according to the embodiment of the present technology, it is possible to compensate for reduction in the output of the phase difference detection pixel by multiplying the output from the phase difference detection pixel by a gain, thereby preventing degradation of image quality.

1-2. Correction Process

Figure 5:
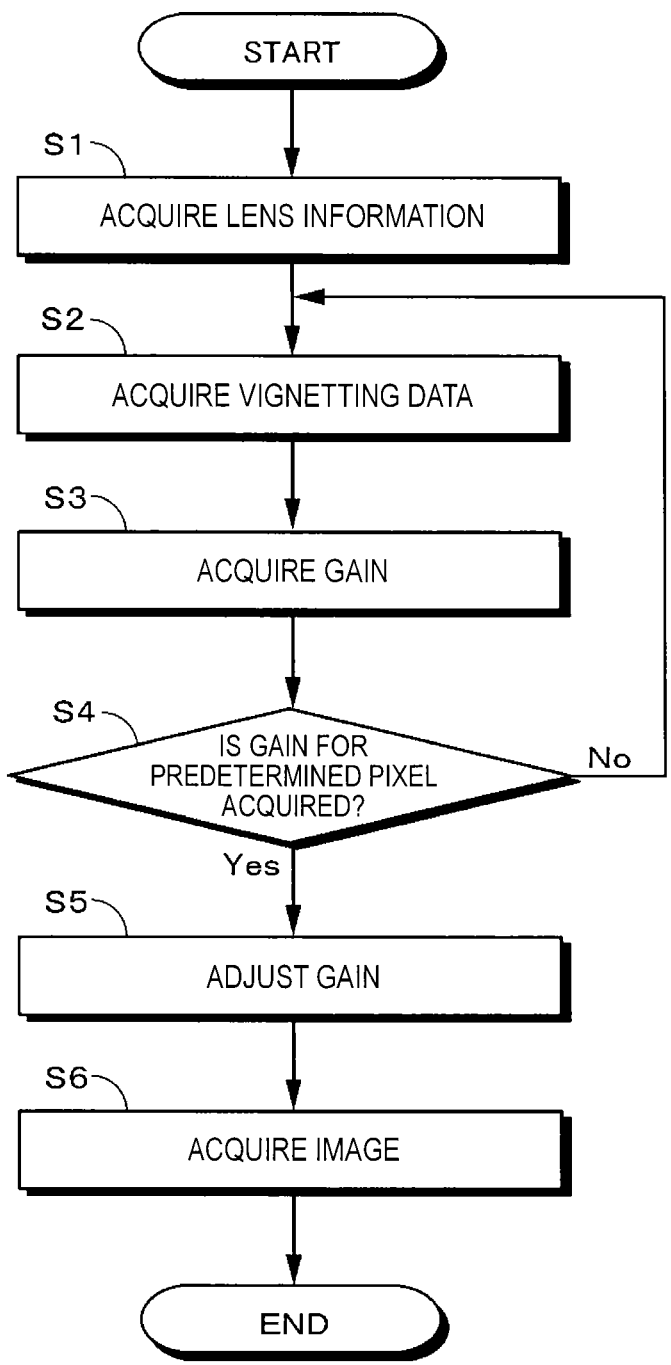
FIG. 5 is a flowchart showing a flow of a correction process.

A correction process according to the embodiment of the present technology will now be described with reference to the flowchart of FIG. 5. This correction process starts, for example, when a user performs a shutter input to the image pickup apparatus 10.

In step S1, the gain acquisition unit 31 acquires lens information from the imaging optical system 11. This lens information includes a zoom (focal length), a focus (distance from subject), and an aperture (f-number). In step S2, the gain acquisition unit 31 acquires vignetting based on the lens information and image height.

Vignetting will now be described. Vignetting is a phenomenon which occurs due to the fact that light beams incident on the periphery of the lens do not pass through the entire area of the aperture diameter which is an effective aperture and light beams are shielded by the edge or rim of the lens in the front and rear of the aperture, resulting in reduction in the light intensity.

Figure 6:
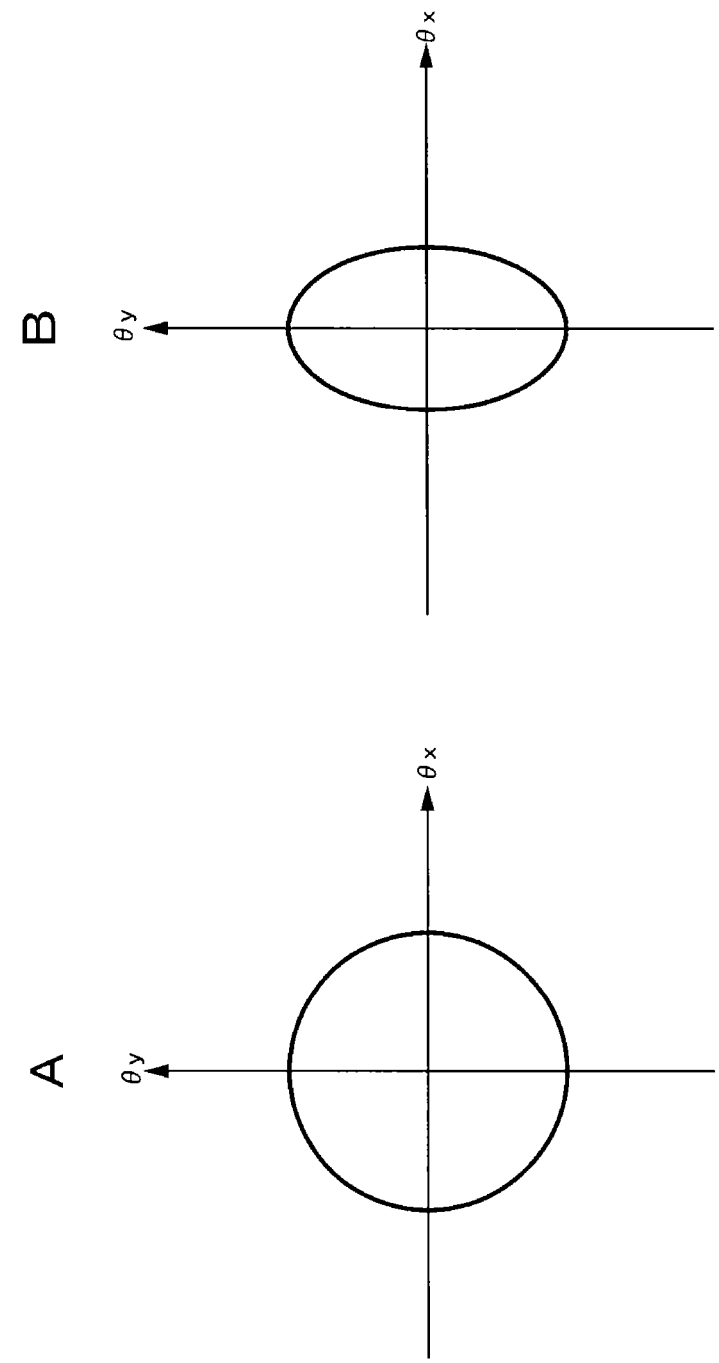
FIG. 6A is a diagram for explaining vignetting on an optical axis.
FIG. 6B is a diagram for explaining vignetting off the optical axis.

FIGS. 6A and 6B are diagrams illustrating a shape of vignetting on the grid in which the horizontal axis is set as x direction and the vertical axis is set to y direction. As shown in FIG. 6A, light is not shielded on the optical axis and vignetting becomes a shape close to a true ideal circle. On the other hand, as shown in FIG. 6B, mechanical vignetting occurs due to the shielding of light at the edge or rim of the lens as it becomes off-axis and thus it is not true circle.

The gain acquisition unit 31 has a vignetting table including vignetting data, lens information, and image height, which are associated with each other. The gain acquisition unit 31, when acquiring the lens information and image height, can acquire vignetting data by referring to the vignetting table based on the obtained lens information and image height.

Figure 7:
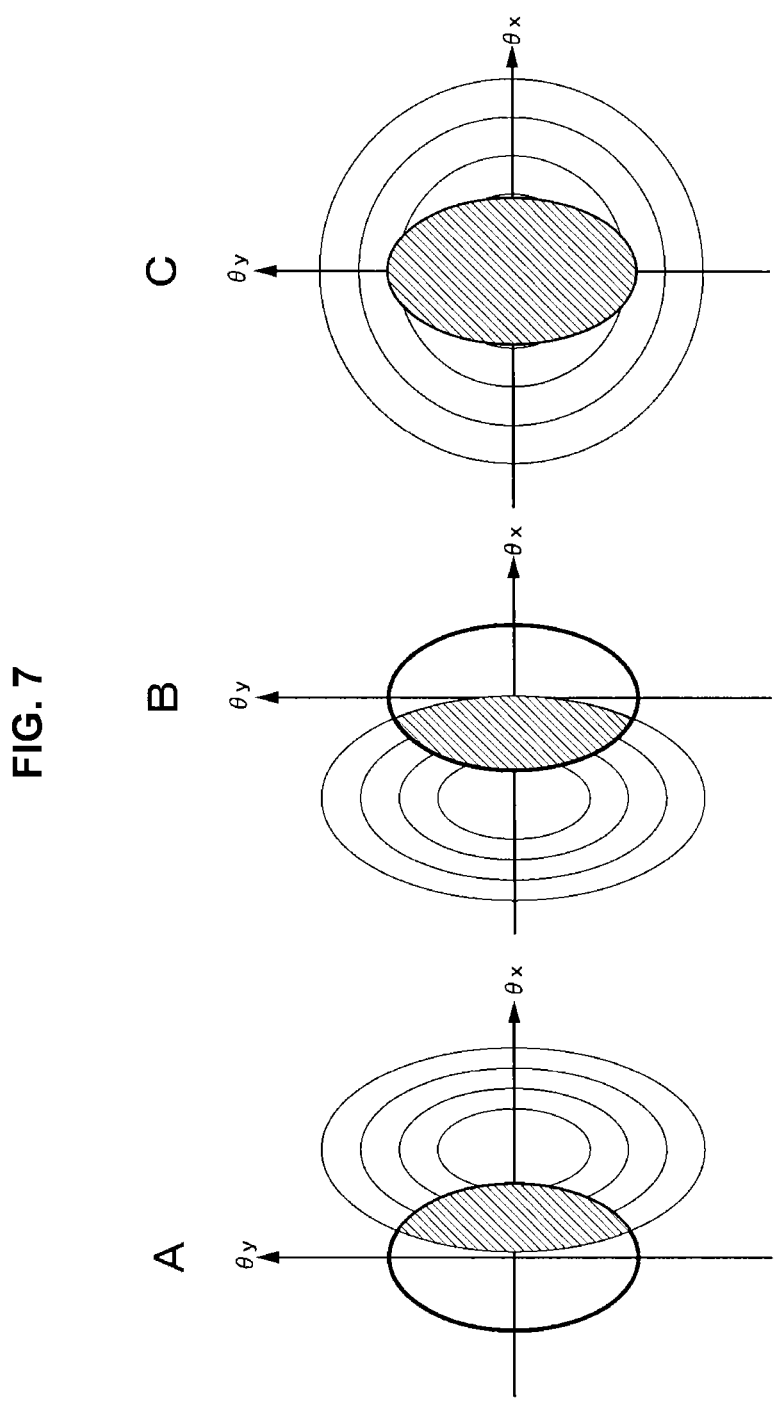
FIG. 7A is a diagram for explaining the light receiving distribution and vignetting of the first phase difference detection pixel.
FIG. 7B is a diagram for explaining the light receiving distribution and vignetting of the second phase difference detection pixel.
FIG. 7C is a diagram for explaining the light receiving distribution and vignetting of G pixel.

The gain acquisition unit 31 then calculates an output $P1_{out}$ of the first phase difference detection pixel P1 based on the vignetting data and light receiving distribution using the following Equation (1). In Equation (1), $K_{P1}$ is the weighting factor for the first phase difference detection pixel P1. In addition, as shown in FIG. 7A, the incident light enters only the portion (hatched portion) where the light receiving distribution and vignetting are overlapped.

$$P1_{out} = \sum_i \sum_j K_{P1}(i, j) \tag{1}$$

An output $P2_{out}$ of the second phase difference detection pixel P2 is calculated based on the vignetting data and light receiving distribution using the following Equation (2). In Equation (2), $K_{P2}$ is the weighting factor for the second phase difference detection pixel P2. In addition, as shown in FIG. 7B, the incident light enters only the portion (hatched portion) where the light receiving distribution and vignetting are overlapped.

$$P2_{out} = \sum_i \sum_j K_{P2}(i, j) \quad (2)$$

Furthermore, an output $G_{out}$ of the G pixel is calculated based on theoretical or measuring value of the light receiving distribution of the G pixel adjacent or near to the phase difference detection pixel using the following Equation (3). In Equation (3), $K_G$ is the weighting factor for the G pixel. In addition, as shown in FIG. 7C, the incident light enters only the portion (hatched portion) where the light receiving distribution and vignetting are overlapped.

$$G_{out} = \sum_i \sum_j K_G(i, j) \quad (3)$$

Next, in step S3, the gain acquisition unit acquires a gain. The gain acquisition unit 31 calculates a gain $P1_{gain}$ from the ratio of $G_{out}$ to $P1_{out}$ using the following Equation (4). The gain $P1_{gain}$ is to be multiplied by the output of the first phase difference detection pixel P1.

$$P1_{gain} = \frac{\sum_i \sum_j K_G(i, j)}{\sum_i \sum_j K_{P1}(i, j)} \quad (4)$$

Moreover, the gain acquisition unit 31 calculates a gain $P2_{gain}$ from the ratio of $G_{out}$ to $P2_{out}$ using the following Equation (5). The gain $P2_{gain}$ is to be multiplied by the output of the second phase difference detection pixel.

$$P2_{gain} = \frac{\sum_i \sum_j K_G(i, j)}{\sum_i \sum_j K_{P2}(i, j)} \quad (5)$$

In this way, the gain acquisition unit 31 acquires the gain. Next, in step S4, the controller 16 determines whether the gain for a predetermined phase difference detection pixel is calculated. If the gain for a predetermined phase difference detection pixel is not calculated, then the process proceeds to step S1 (No in step S4). Steps S1 to S4 are repeated until gains for all of the phase difference detection pixels are calculated.

In step S4, if it is determined that the gain for the predetermined phase difference detection pixel has been obtained, then the process proceeds to step S5 (Yes in step S4). In addition, the predetermined phase difference detection pixel, i.e., the phase difference detection pixel for which a gain is to be obtained, may be all of the phase difference detection pixels having the image sensor 12 or may be a particular phase difference detection pixel.

When a gain is obtained based on a particular phase difference detection pixel, for example, the gain may be obtained for the phase difference detection pixels which are arranged at equal intervals, spaced by the predetermined number of lines. Alternatively, the gain may be obtained only for the predetermined phase difference detection pixel. It may be also possible to compensate for a gain for the phase difference detection pixel on the line from which a gain is not obtained. This compensation is performed by linear interpolation. Therefore, it is possible to reduce the number of phase difference detection pixels for which a gain is to be obtained and thus to achieve the reduction in processing load, the high speed processing, or the like in the gain acquisition unit 31.

Next, in step S5, the correction processing unit 32 adjusts the output of the first phase difference detection pixel P1 by multiplying the output of the first phase difference detection pixel P1 by the gain $P1_{gain}$ for the first phase difference detection pixel P1 acquired by the gain acquisition unit 31.

Furthermore, the correction processing unit 32 adjusts the output of the second phase difference detection pixel P2 by multiplying the output of the second phase difference detection pixel P2 by the gain $P2_{gain}$ for the second phase difference detection pixel P2 acquired by the gain acquisition unit 31.

In step S6, the predetermined process described above as being performed in the pre-processing circuit 13, the camera processing circuit 14, or the like is performed on an imaging signal composed of the pixel signals outputted from the normal pixels and phase difference detection pixels constituting the image sensor 12, thereby acquiring image data.

As described above, the correction process is carried out according to the embodiment of the present technology. According to the embodiment of the present technology, it is possible to prevent a reduction in the output of the phase difference detection pixel by multiplying the pixel signal from the phase difference detection pixel by a gain. Therefore, it is possible to use the pixel signal from the phase difference detection pixel which has been treated as a defective pixel in related art in a similar manner to the pixel signal from the normal pixel. In particular, it is possible to improve image quality of an image having a susceptible high-frequency component by correcting the defective pixel.

2. Modified Example

It should be understood by those skilled in the art that various modifications, combinations, sub-combinations and alterations may occur depending on design requirements and other factors insofar as they are within the scope of the appended claims or the equivalents thereof.

The embodiment of the present technology is applicable to an image pickup apparatus including a camera body and a lens which are formed integrally with each other, and also applicable to an image pickup apparatus including a camera body and a lens attachable to the camera body, a so-called interchangeable lens.

Figure 8:
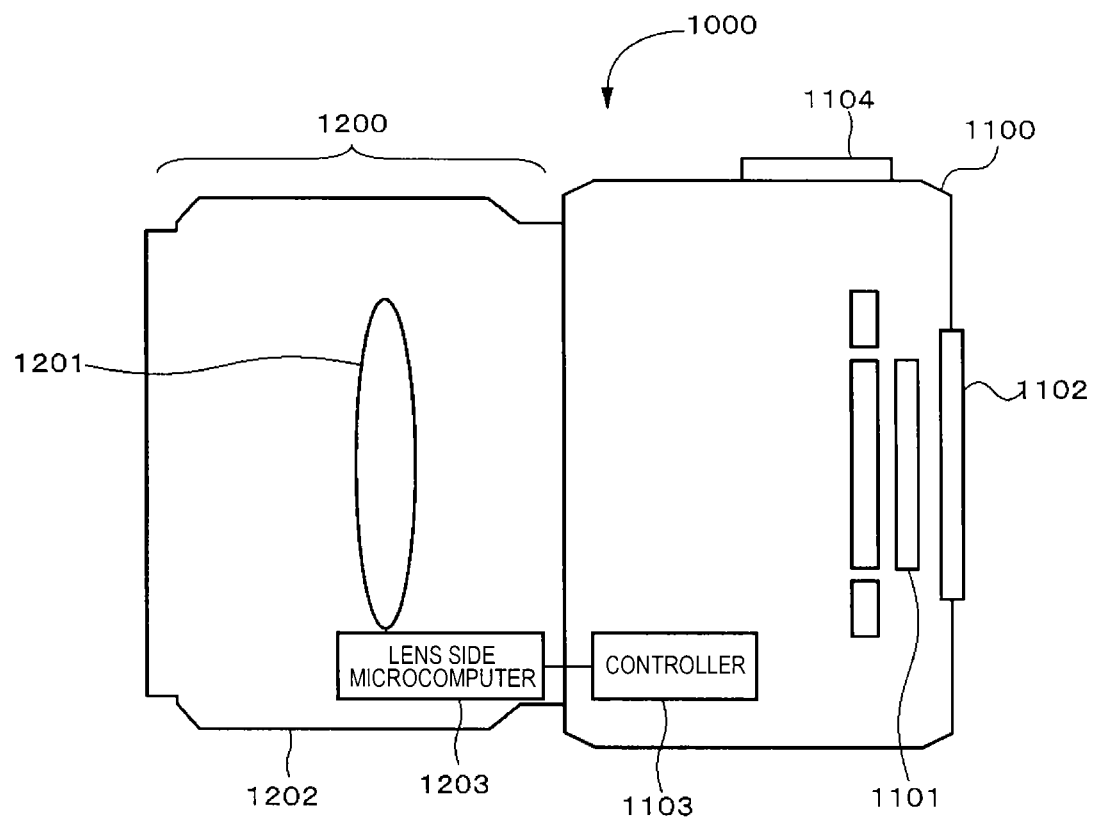
FIG. 8 is a diagram illustrating a configuration of a modified example of the image pickup apparatus.

Referring to FIG. 8, an image pickup apparatus 1000 including a camera body 1100 and an interchangeable lens will be described. FIG. 8 is a schematic diagram illustrating a schematic configuration of the image pickup apparatus 1000. As illustrated in FIG. 8, the interchangeable lens 1200 is attached to the camera body 1100 included in the image pickup apparatus 1000. The interchangeable lens is configured to include a photographing lens 1201 or the like which is installed inside a lens barrel 1202.

An image sensor 1101 is provided in the camera body 1100. The image sensor 1101 includes normal pixels and phase difference detection pixels as explained in the embodiment described above. Light from a subject is incident on the image sensor 1101 via the photographing lens 1201 and then finally an image is obtained as described above.

The camera body 1100 of the image pickup apparatus 1000 is provided with a display 1102 which functions as an electronic viewfinder. The display 1102 corresponds to the display unit in the embodiment described above and may be a flat display such as a liquid crystal display (LCD) or an organic EL. The display 1102 is supplied with image data obtained as a result of processing of the image signal extracted from the image sensor 1101 in the camera processing unit or the like, and a current subject image (moving image) is displayed on the display 1102. In FIG. 8, the display 1102 is provided at the rear side of a housing, but the position of the display is not limited thereto. Specifically, the display 1102 may be provided on the upper side of the housing, or the display 1102 may be movable or removable.

The camera body 1100 is provided with a controller 1103. The controller 1103 is similar to the controller in the image pickup apparatus described above with reference to FIG. 1. The controller 1103 controls the respective components of the image pickup apparatus 1000 or the entire image pickup apparatus 1000. The controller 1103 also functions as the gain acquisition unit and the correction processing unit.

In addition, the camera body 1100 is provided with a release button 1104 as an input unit. When the release button 1104 is pressed by a user, image signals for one frame are outputted from the image sensor 1101.

The interchangeable lens 1200 is provided with a lens side microcomputer 1203. The lens side microcomputer 1203 is a microcomputer provided in the interchangeable lens 1200 and is intended to obtain lens information such as a zoom (focal length), a focus (distance from subject), and an aperture (f-number) of the photographing lens 1201.

When the camera body 1100 and the interchangeable lens 1200 are connected to each other, the lens side microcomputer 1203 is connected with the controller 1103, for example, by the contact of a terminal (not shown), and thus information can be transmitted and received between them. In this state, the lens side microcomputer 1203 obtains lens information and transmits the lens information to the controller 1103. The controller 1103 then performs the correction process according to the embodiment of the present technology.

With such a configuration, the embodiment of the present technology can be implemented even when the camera body 1100 and the interchangeable lens have their respective housings. In addition, the embodiment of the present technology can be implemented even when the interchangeable lens is replaced with different type of lens.

Additionally, the present technology may also be configured as below.

(1) An image pickup apparatus including:
an image sensor including a plurality of phase difference detection pixels that each perform pupil division of a photographing lens;
a gain acquisition unit for acquiring a gain used to correct an output of the phase difference detection pixels; and
a correction processing unit for correcting the output of the phase difference detection pixels using the gain acquired by the gain acquisition unit.

(2) The image pickup apparatus according to (1), wherein the gain acquisition unit acquires the gain based on information about the photographing lens, an image height, and a characteristic of the image sensor.

(3) The image pickup apparatus according to (1) or (2), wherein the gain acquisition unit acquires the gain for a characteristic of some phase difference detection pixels among the plurality of phase difference detection pixels, and wherein the correction processing unit corrects the output of the plurality of phase difference detection pixels using the gain acquired for the characteristic of the some phase difference detection pixels.

(4) The image pickup apparatus according to any one of (1) to (3), wherein the gain acquisition unit acquires vignetting data by referring to a vignetting table that holds in advance information about the photographing lens and the vignetting data corresponding to the image height, and acquires the gain based on the vignetting data and a characteristic of the phase difference detection pixels.

(5) The image pickup apparatus according to any one of (1) to (4), wherein a characteristic of the image sensor is a light receiving distribution in pixels included in the image sensor.

(6) The image pickup apparatus according to any one of (1) to (5), wherein the phase difference detection pixels each use a G pixel in the image sensor.

(7) An image pickup method implemented by an image pickup apparatus including an image sensor including a plurality of phase difference detection pixels that each perform pupil division of a photographing lens, the method including:
acquiring a gain used to correct an output of the phase difference detection pixels; and
correcting the output of the phase difference detection pixels using the gain.

The present disclosure contains subject matter related to that disclosed in Japanese Priority Patent Application JP 2012-165341 filed in the Japan Patent Office on Jul. 26, 2012, the entire content of which is hereby incorporated by reference.

What is claimed is:

1. An image pickup apparatus comprising:
an image sensor including a plurality of phase difference detection pixels that perform pupil division of a photographing lens; and
a processor operable to:
acquire a gain used to correct an output of the plurality of phase difference detection pixels, wherein the gain for each of the plurality of phase difference detection pixels is calculated based on:
an overlapped region where vignetting and a light receiving distribution of the phase difference detection pixels overlap, wherein an incident light enters only in the overlapped region,
a ratio of an output of a green pixel adjacent to or near a corresponding phase difference detection pixel of the plurality of phase difference detection pixels, and an output of the corresponding phase difference detection pixel, and
a characteristic of predetermined phase difference detection pixels among the plurality of phase difference detection pixels; and
correct the output of the plurality of phase difference detection pixels using the acquired gain.

2. The image pickup apparatus according to claim 1, wherein the processor is operable to acquire the gain based on information about the photographing lens, an image height, and a characteristic of the image sensor.

3. The image pickup apparatus according to claim 1, wherein the processor is operable to:
   acquire vignetting data by referring to a vignetting table that includes predetermined information about the photographing lens and the vignetting data corresponding to the image height; and
   acquire the gain based on the vignetting data and a characteristic of the plurality of phase difference detection pixels.

4. The image pickup apparatus according to claim 1, wherein a characteristic of the image sensor is a light receiving distribution in pixels included in the image sensor.

5. The image pickup apparatus according to claim 1, wherein the phase difference detection pixels each uses a green pixel in the image sensor.

6. The image pickup apparatus according to claim 1, wherein one or more of the plurality of phase difference detection pixels is configured as a pair of a first phase difference detection pixel and a second phase difference detection pixel.

7. The image pickup apparatus according to claim 6, wherein the first phase difference detection pixel and the second phase difference detection pixel are configured to shield incident light at opposite sides to each other with respect to a distance measuring direction.

8. An image pickup method comprising:
in an image pickup apparatus including an image sensor including a plurality of phase difference detection pixels that perform pupil division of a photographing lens:
acquiring a gain used to correct an output of each of the plurality of phase difference detection pixels, wherein the gain for each of the plurality of phase difference detection pixels is calculated based on:
   an overlapped region where vignetting and a light receiving distribution of the phase difference detection pixels overlap, wherein an incident light enters only in the overlapped region,
   a ratio of an output of a green pixel adjacent to or near a corresponding phase difference detection pixel of the plurality of phase difference detection pixels, and an output of the corresponding phase difference detection pixel, and
   a characteristic of predetermined phase difference detection pixels among the plurality of phase difference detection pixels; and
correcting the output of each of the plurality of phase difference detection pixels using the acquired gain.

* * * * *